United States Patent

Roush, Jr.

[15] 3,643,766
[45] Feb. 22, 1972

[54] RAILWAY VEHICLE BRAKE RIGGING
[72] Inventor: Roy W. Roush, Jr., Downers Grove, Ill.
[73] Assignee: General Motors Corporation, Detroit, Mich.
[22] Filed: Mar. 19, 1970
[21] Appl. No.: 20,924

[52] U.S. Cl. ................................................188/190, 188/213
[51] Int. Cl. ..........................................................B60t 8/24
[58] Field of Search ..................188/52, 56, 205 A, 210–213, 188/190, 193

[56] References Cited

UNITED STATES PATENTS

| | | | |
|---|---|---|---|
| 1,056,479 | 3/1913 | Williams | 188/193 |
| 1,998,323 | 4/1935 | Kjolseth | 188/190 |
| 2,808,906 | 10/1957 | Busch | 188/190 |
| 2,968,371 | 1/1961 | Holin | 188/205 X |

Primary Examiner—Duane A. Reger
Attorney—J. L. Carpenter and Robert J. Outland

[57] ABSTRACT

In a preferred embodiment, a multiple axle railway vehicle truck has axle and wheel assemblies mounted with relatively large lateral clearances to provide for lateral movement when negotiating sharp curves. The brake rigging is provided with stabilizing means adapted to normally maintain the brake shoes in a desired nominal position relative to the frame so as to be properly aligned with the wheel treads in their centered axle positions, the stabilizing means being resiliently yieldable to permit any of the brake shoes to be deflected outwardly when they are contacted by their respective wheel flanges upon a sufficient lateral movement of the their respective axles.

2 Claims, 5 Drawing Figures

INVENTOR.
Roy W. Roush, Jr.
BY
Robert J. Outland
ATTORNEY

RAILWAY VEHICLE BRAKE RIGGING

FIELD OF THE INVENTION

This invention relates to railway vehicles and, more particularly, to improved brake rigging for such vehicles, having stabilizing means adapted to properly position the wheel brake shoes under operating conditions including a high degree of lateral wheel motion.

DESCRIPTION OF THE PRIOR ART

The art pertaining to railway vehicles and railway trucks is replete with examples of brake rigging mounted on the vehicle or truck frame and comprising actuating linkage movably supporting wheel brake shoes for engagement with the wheel treads to provide for braking the vehicle. It is also known to provide stabilizing means to minimize lateral movement of the brake rigging and maintain the brake shoes substantially in a predetermined position with respect to the truck frame so that the shoes will be properly aligned with the wheel treads under normal operating conditions. One form of brake rigging including such stabilizing means is shown in U.S. Pat. No. 2,911,073 Holin.

While stabilizing means of the above-mentioned type have proved satisfactory in many instances, they would not be adequate for use where it is desired to provide for a relatively high degree of lateral movement of the wheel and axle assemblies in the vehicle frame, since excessive outward motion of any of the wheels will cause the wheel flanges to engage the brake shoes and bend the brake rigging stabilizer outwardly so that it may be permanently deformed and subsequently maintain the brake shoes in a misaligned position with respect to the wheel treads in their centered axle positions. Such high lateral movement of the wheel and axle assemblies in a truck frame is necessary under certain circumstances; for example, in the case of a relatively long truck having three or more axles in which it is desired to provide for the negotiation of relatively sharp curves. In this case, the intermediate wheel and axle assemblies must be permitted to move laterally in one direction while the end wheel and axle assemblies are moving laterally in the opposite direction in order to permit all the wheels to maintain proper engagement with the rails while negotiating the sharp curves.

SUMMARY OF THE INVENTION

The present invention provides an improved railway brake rigging arrangement, including resiliently yieldable stabilizer means arranged to normally maintain the wheel brake shoes in predetermined desired nominal positions with respect to the wheel and axle mounting frame but to provide for the necessary lateral movement of the brake shoes whenever excessive outward lateral motion of their respective wheels causes the wheel flanges to force them outwardly. When the wheel and axle assemblies return to the centered position, the resilient stabilizer means return the brake shoes to their desired positions so as to provide for proper positioning of the shoes under all conditions of operation.

These and other advantages of the invention will be more readily understood from the following description of a preferred embodiment, taken together with the accompanying drawings.

DESCRIPTION OF THE PREFERRED EMBODIMENT

Figure 1:
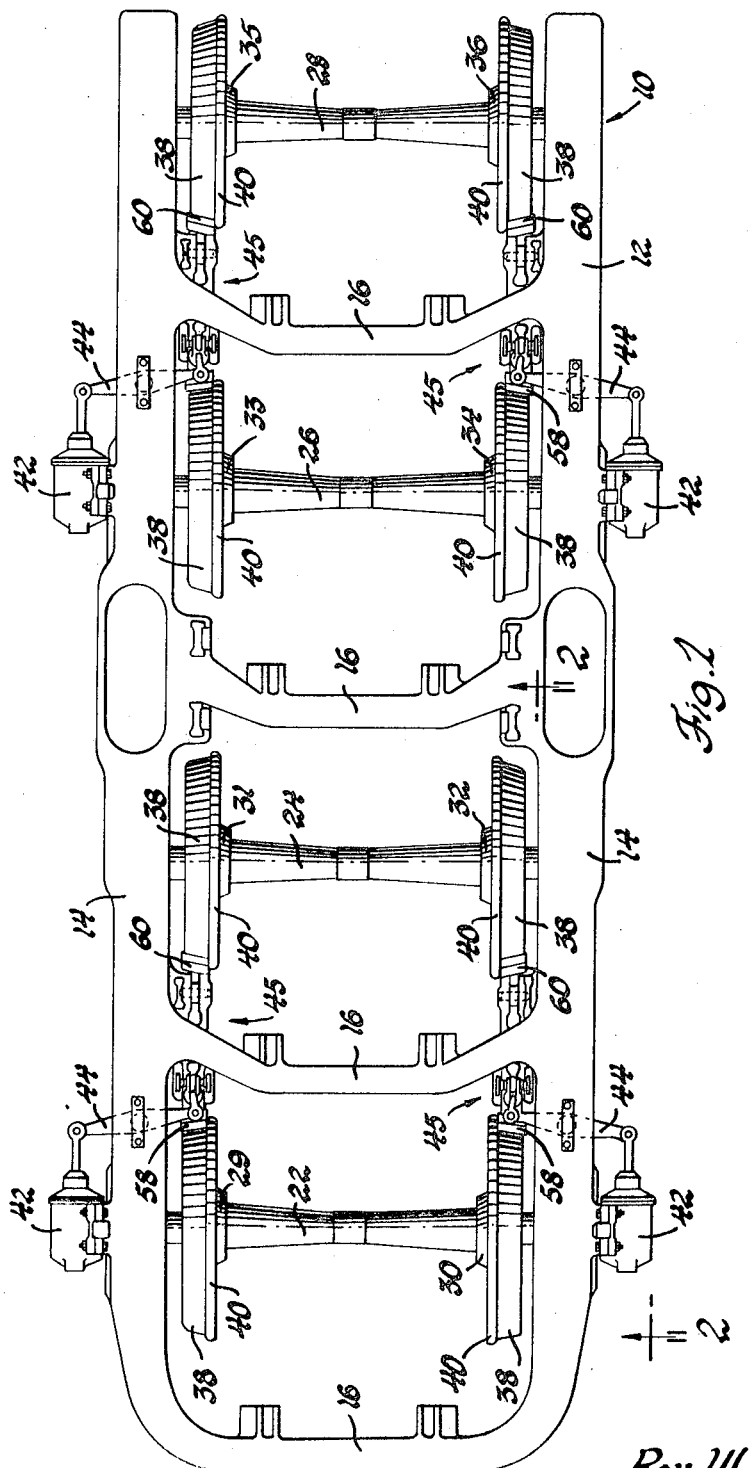
FIG. 1 is a plan view of a four-axle railway truck having brake rigging formed according to the invention.

Referring now to the drawings in more detail, numeral 10 generally indicates a railway vehicle comprising a railway truck of the type disclosed in U.S. Pat. No. 3,313,244 Koci, the disclosure of which is hereby incorporated by reference in this application. As may be noted, certain portions of the truck assembly not pertinent to the present invention have not been illustrated in the drawings, while other portions, such as the brake rigging, which are pertinent and are illustrated herein, have not been shown in the referenced patent.

The truck 10 includes a rigid frame 12 having longitudinally extending side members 14 integrally connected by transversely extending transom members 16 which are adapted to support traction motors (not shown). The side members 14 include a plurality of depending pedestals 18 in which are retained journal boxes 20. The journal boxes, in turn, rotatably mount four longitudinally spaced, laterally extending axles 22, 24, 26, 28, which are arranged to permit a relatively high degree of lateral movement for a purpose to be subsequently described.

Wheels 29 to 36 are mounted in laterally spaced pairs on the respective axles, the wheels on one side of the truck being approximately longitudinally aligned as are those on the other side of the truck. It should be understood that the provision for lateral movement of the axles permits a certain amount of lateral misalignment of the normally aligned wheels under various operating conditions. The wheels include conventional track engaging tread portions 38 and guide flanges 40, located along the inner edges of the tread portions.

Figure 2:
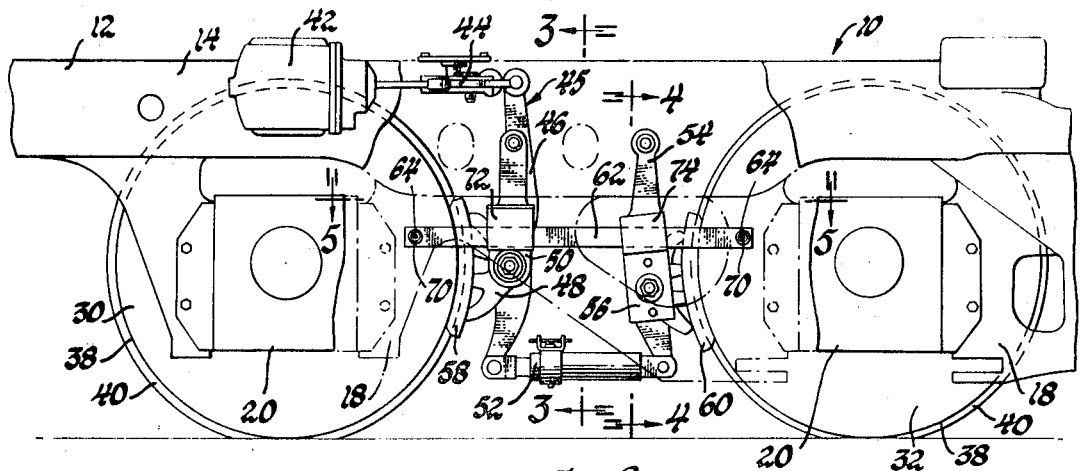
FIG. 2 is a fragmentary side view taken generally in the plane indicated by the line 2—2 of FIG. 1 and viewed in the direction of the arrows, with portions of the truck frame, as indicated by the phantom lines, broken away to clearly disclose certain elements of the brake rigging.
Figure 3:
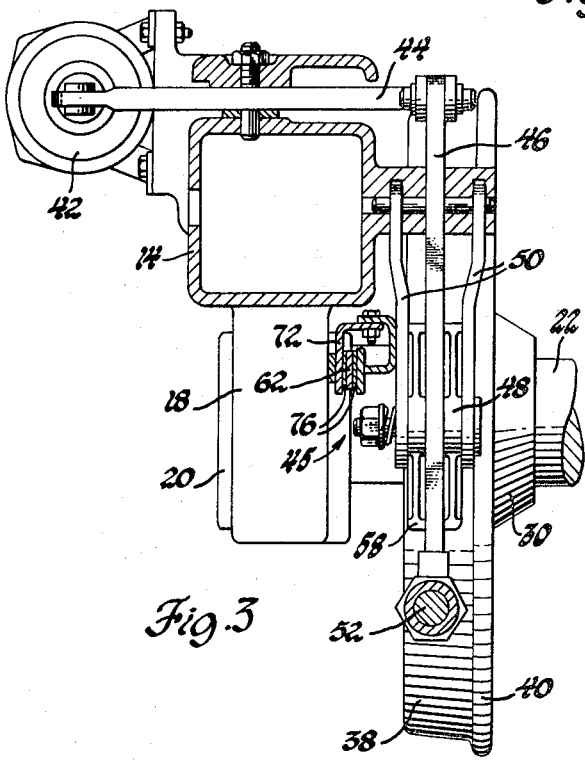
FIG. 3 is a cross-sectional view taken generally in the plane indicated by the line 3—3 of FIG. 2 as viewed in the direction of the arrows.
Figure 4:
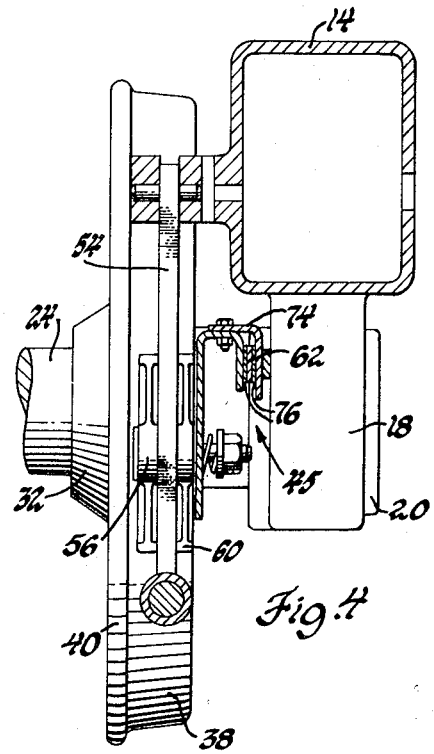
FIG. 4 is a cross-sectional view taken in the plane indicated by the line 4—4 of FIG. 2 as viewed in the direction opposite to FIG. 3.
Figure 5:
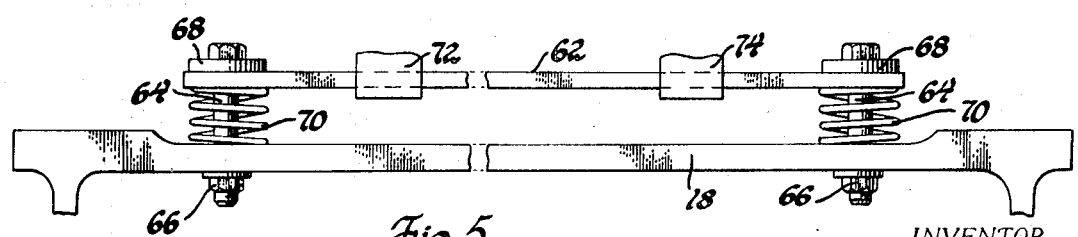
FIG. 5 is a cross-sectional view showing the resilient stabilizing means taken in the plane indicated by the line 5—5 of FIG. 2 and viewed in the downwardly direction indicated by the arrows.

Suitable braking means for the truck wheels are provided, including a plurality of frame mounted brake cylinders 42, connected by horizontal levers 44 to suitable brake linkage 45 disposed between the longitudinally aligned pairs of wheels at each end and on each side of the truck frame. As best seen in FIGS. 2–4, each brake linkage includes a live lever 46 connecting with a brake head 48 which is movable supported on the frame by strap 50. Lever 46 also connects through an adjustable link 52 with a dead lever 54 that is pivotably supported by the frame and, in turn, supports a brake head 56. Brake heads 48, 56 retain brake shoes 58, 60 respectively, which are positioned so as to be movable by operation of the brake linkage into engagement with the wheel treads 38 of their respective wheels.

Stabilizing means are also provided to laterally connect each of the brake linkages with the frame. These stabilizing means include longitudinal guide members 62, which are laterally movably retained on transversely extending bushings 64 by suitable bolt and nut retainer means 66. Retainer means 66 secure the bushings 64 to truck frame pedestals 18 and cooperate with bushings 64 to fixedly position washers 68, which act as stops. Coil springs 70 disposed around the bushings 64 bias guide members 62 away from the truck frame pedestals and into engagement with fixed washers 68. Suitable shoe guide means 72, 74 are secured respectively to one of the links 50 supporting brake head 48 and to brake head 56. The guide means 72, 74 include suitable wear inserts 76 which engage the opposite sides of guide member 62 so as to maintain a fixed lateral dimension between the guide means 62 and the two brake heads 48, 56 and their respective brake shoes 58, 60.

In operation, when the various axles are in their centered positions in the truck frame, springs 70 maintain the guide means 62 in their furthest inward positions against the washers 68, thereby holding the brake shoes in predetermined nominal positions with respect to the truck frame 12. These positions, as indicated in FIGS. 3 and 4, permit a small amount of lateral movement of the axles before the brake shoes are engaged by their respective wheel flanges 40.

When, in the operation of the railway truck, there is a greater lateral movement of one or all of the axle members; such as, for example, when a relatively sharp curve is negotiated; then the flanges of the outwardly moving wheels will engage their respective brake shoes, forcing them outwardly and compressing, as necessary, the springs of the respective guide members 62, so as to permit the necessary lateral movement. During this time, springs 70 provide a slight return bias tending to center the axles. However, this force is not sufficient to prevent the lateral motion of the axles necessary to round a curve or the like. Upon the return of the axles to the centered position, as normally occurs during running on straight track, springs 70 will again force the guide means 62 to their inward positions, returning the brake shoes that have been moved inwardly to their initial predetermined positions with respect to the truck frame, wherein they are properly aligned with the wheel treads for braking actuation.

While the invention has been described with respect to a specific embodiment and for the accomplishment of specific purposes, it should be apparent that numerous modifications could be made within the spirit and scope of the inventive concept involved and such changes are intended to be encompassed herein as are within the language of the following claims.

I claim:
1. A railway vehicle truck comprising
   a rigid frame,
   at least one pair of laterally movable longitudinally spaced transversely extending axles rotatably mounted in said frame,
   two transversely spaced wheels fixed to each axle, the wheels of each pair of axles being arranged in longitudinally aligned pairs with each wheel having a track engageable tread and a flange at the inner edge of said tread,
   brake rigging including interconnecting linkage means carried by said frame intermediate the wheels of each longitudinally aligned pair of wheels, each said linkage means supporting a pair of longitudinally spaced brake shoes, one for each wheel, disposed adjacent their respective wheel treads for braking said wheels, said brake rigging providing for limited lateral movement of said brake shoes, and
   stabilizer means comprising a longitudinally extending guide member for each linkage means carrier on laterally extending retainers secured to said truck frame and spring means biasing the opposite ends of said guide members inwardly toward predetermined lateral positions, said spring means being resiliently yieldable to permit limited outward movement of said guide member ends, said linkage means including means laterally connecting the brake shoes of each said pair with adjacent longitudinally spaced portions of their respective guide members, whereby each said guide member normally maintains its connected brake shoes in a predetermined desired lateral position with respect to said truck frame but is outwardly movable at either or both ends to permit selective outward movement of said brake shoes upon a sufficient lateral movement of any axle in a direction resulting in engagement of a brake shoe by its respective wheel flange.

2. A railway vehicle truck as defined in claim 1 and comprising at least two pairs of said axles.

* * * * *